May 31, 1966 L. N. LEA 3,253,831

PHONOGRAPH APPARATUS WHICH OPERATES IN ANY POSITION

Filed June 6, 1963

INVENTOR,
LAWRENCE N. LEA,

BY [signature]

ATTORNEY.

United States Patent Office 3,253,831
Patented May 31, 1966

3,253,831

PHONOGRAPH APPARATUS WHICH OPERATES IN ANY POSITION

Lawrence N. Lea, 1683 University Ave., New York, N.Y.
Filed June 6, 1963, Ser. No. 286,066
8 Claims. (Cl. 274—9)

The present invention relates to phonograph apparatus operated by either an electric or a spring motor and particularly adaptable for use in dolls, toys, display devices and the like.

The phonograph heretofore has been usually designed to be operated in upright position. When away from this normal, it either plays poorly or not at all.

It is therefore an object of this invention to provide a novel construction in a phonograph apparatus so it will play properly in any position, hence, a doll or other toy having one in its body or otherwise carried thereon, will play in tilted or in inverted positions or even when the toy is swung, rolled or otherwise moved.

A further object thereof is to provide a novel and improved phonograph apparatus of the character described which can be carried in a rolling or swinging component, or it may even be in a ball.

Another object thereof is to provide that the tone arm of the phonograph apparatus shall be held against movement while the article is in transit during shipment and when put away when not in use.

Another object thereof is to provide that if violent motions occur during shipment due to rough handling of packages containing items equipped with these phonographs or the phonograph units alone, that the tone arm shall not become dislodged or damaged.

Still a further object of this invention is to provide a novel and improved phonograph apparatus of the character mentioned, which is simple in construction, reasonably cheap to manufacture and which is efficient in carrying out the purposes for which it is designed.

For the practice of this invention, I provide that the record's turntable shaft shall be capable of limited longitudinal movement and hence rely on the action of gravity to maintain the stylus in contact with the record when the phonograph is in an inverted position where the plane of the record is horizontal or slanted. The tone arm is springy so that such contact is maintained when the phonograph is upright, upright though slanted and when the plane of the record is vertical or nearly so. This springiness is of course one effecting only a slight pressure of the stylus on the record, sufficient to have good playing. However, this is not sufficient to maintain proper contact of the stylus and record when the phonograph is in an inverted position, and so I have provided for the sliding movement of the turntable shaft. The turntable may be driven by a spring motor, or as I have shown it herein to be driven by an electric motor. I also provide stops for the tone arm at the start and finish positions of the stylus as well as an element to limit the possible accidental movement of the tone arm away from the record. Further, in order to hold the tone arm stationary in transit or storage, to avoid the stylus from scratching the record, I provide a comparatively deep groove in the record to hold the stylus from lateral movement at the finish end of the record.

A more detailed description will now be given of a preferred embodiment of this invention and its mode of operation.

In the accompanying drawing which forms a part of this specification, similar characters of reference indicate corresponding parts in all the views.

Figures 1, 2, 3, 4, 5:
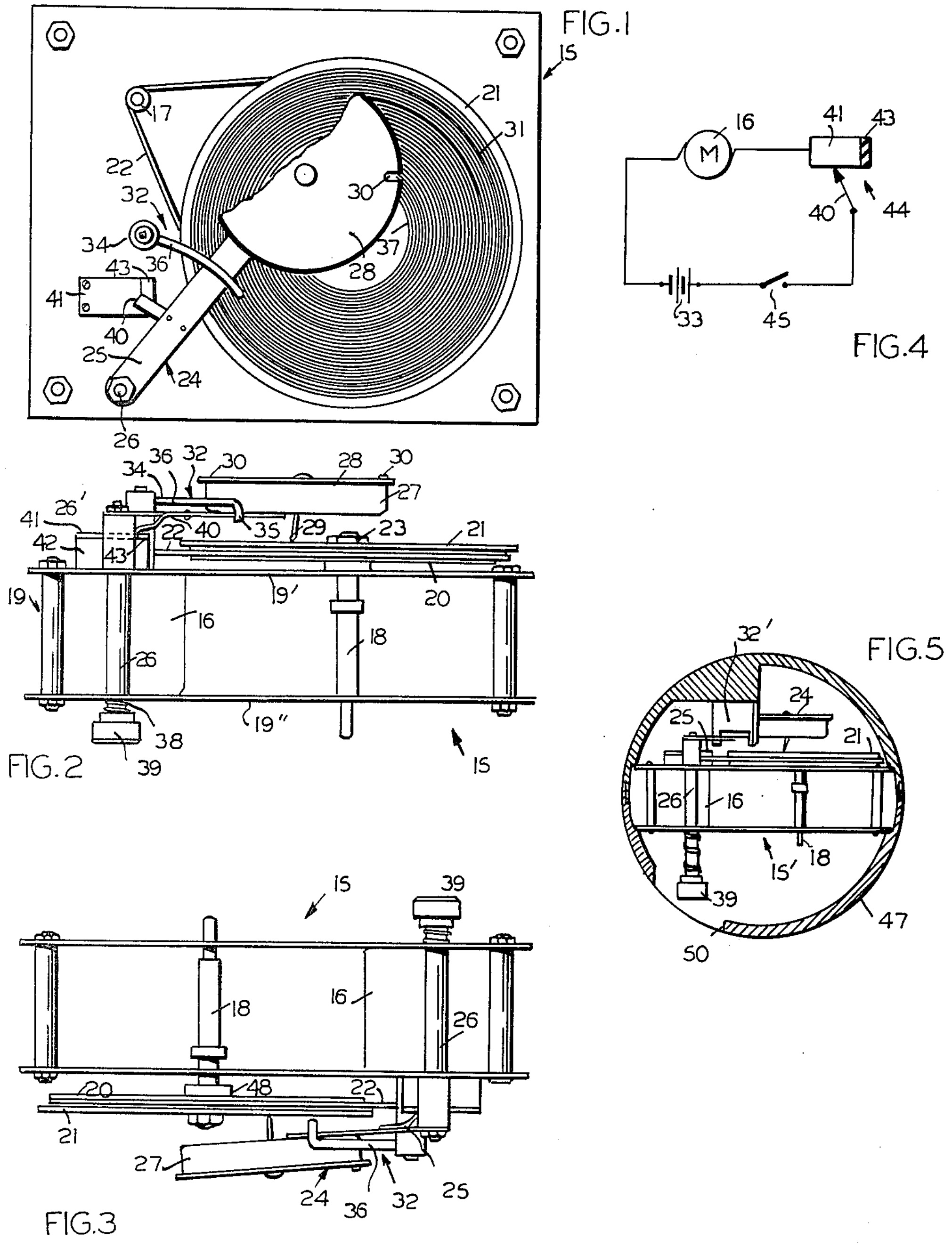
FIG. 1 is an elevational view of a phonograph apparatus embodying the teachings of this invention.
FIG. 2 is a top plan view of FIG. 1.
FIG. 3 is a view like FIG. 1, but inverted.
FIG. 4 is a diagram of an electrical circuit which may be employed for the operation of this apparatus.
FIG. 5 is drawn to a reduced scale and shows the phonograph apparatus mounted within a ball or roller shown in section. This embodiment is of a modified construction.

In the drawing, the numeral 15 designates generally a phonograph apparatus, which is a preferred embodiment thereof. It includes an electric motor 16, whose shaft is fitted with a comparatively small pulley 17. A shaft 18, journalled on the frame denoted generally by the numeral 19, carries a comparatively large pulley 20 which supports and serves as the turntable for the record 21. An endless belt 22 connects said pulleys which are in proper ratio to give the shaft 18 the required speed at which the record 21 shall rotate. Said record is held fast to the turntable 20 by the nut 23 on the threaded end of the shaft 18. The spaced frame plates 19′, 19″ hold the motor 16 between them and can also likewise hold the batteries 33 to drive said motor.

The pick-up or tone arm denoted generally by the numeral 24, comprises a thin springy strip 25 which is securely mounted on the shaft 26, at one of its ends, and at its other end, said strip 25 is welded or otherwise suitably secured to a metal cup 27 having a diaphragm 28, from which extends the stylus 29. Said diaphragm is held as a cover on said cup, by for instance, the bent tabs 30 which extend upwardly from the rim of said cup. The stylus extends through said cup, through a hole in the cup's bottom and thence with its point into the sound groove 31 on the record 21. The stylus is fixed to said diaphragm 28 and is clear of said hole in the cup's bottom. Such assembly serves when the record 21 is rotating, to translate the resulting vibrations of the stylus 29, as determined by the sound groove 31, into sound, which action is well known.

An inverted U-structure indicated generally by the numeral 32, straddles the springy strip 25. The legs of this U-shape are indicated at 34 and 35 and the base of same is denoted by the numeral 36. The leg 34 is fixed on the frame piece 19′, and acts as a stop for the tone arm 24 where the stylus 29 is at the start of the record 21. The leg 35 acts as a stop for said tone arm where the stylus is in a rather deep groove 37 which is a continuation of the end of the sound groove 31 of the record. Of course, said leg 35, ends above the record to permit the sliding movement of the shaft 18 when the apparatus is inverted, without such end of said leg touching the record.

Referring to FIG. 2, when the stylus 29 is in contact with the record 21, the strip 25 is spaced from the element 36, slightly more than the required distance of longitudinal movement of the shaft 26, to lift the stylus 29 off the record 21. Said shaft 26 is rotatably mounted through aligned holes in the frame plates 19′, 19″, respectively, and is longitudinally slidable upwardly to come nearly to said element 36. The portion 26' of said shaft 26 which is above the plate 19', is enlarger, so it normally bears against such plate, due to the action of a weak spring 38 which is on such shaft, between the accessible knob 39 and the plate 19''. When said knob is pushed upward, the shaft 26 rises at most, to be near to but spaced from said element 36. It is evident that this knob 39 can be manipulated to lift the tone arm 24 off the record and brought back so that the strip 25 is against the stop 34, and then upon release of hold on such knob, the stylus 29 will contact the record at the start of the sound groove 31.

When this invention is practiced with a phonograph apparatus whose turntable is driven by a spring motor (not shown), then such motor should be designed that its spring shall become fully unwound upon the stylus reaching the end of the record and of course, an accessible wind-up key would be provided to rewind the spring motor. Since the apparatus illustrated herein is driven by the electric motor 16, I have provided that the turntable 20 shall commence to turn when the stylus 29 is at the start of the record 21, and to automatically stop when the stylus reaches the end of the wound groove whereupon the stylus will become lodged in and engaged in the groove 37. To accomplish such motor operation, I provide a conductive brush 40 which extends from the tone arm 24, preferably from the springy strip 25, to make contact with a metal plate 41 fixed on an insulative base 42 on the frame. Such contact continues from the time the stylus 29 is at the start of the record 21 up to the time said stylus reaches the end of the record, whereupon said brush 40 will be on the insulative strip 43 which is flush with said plate 41 on the base 42, and entirely off said plate. Said brush and plate constitute a switch 44 which controls the motor circuit; it being evident that the motor circuit will be closed while said brush and plate are in contact, but will open as soon as said brush is wholly on said insulative strip 43. Such switch is shown interposed in the motor circuit which is powered by the batteries 33.

While the apparatus is in transit or put away when not in use, the tone arm 24 is set so that the stylus is engaged in the groove 37 in the record 21. Since once set up for use, the batteries 33 remain in, it is advisable to have another switch 45 in circuit which is left open. To use the apparatus 15, the switch 45, if included, is closed. Then the knob 39, is pushed to move the stylus 29 off the record 21, and thereupon said nob is turned to bring the strip 25 against the stop 34 and the knob is let go. This brings the stylus into engagement with the start of the sound groove 31 near the record's perimeter and the brush 40 into contact with the plate 41. Hence the switch 44 is closed, thereby closing the motor circuit and the motor 16 will run. The phonograph will play until the stylus 29 reaches the end of the record whereupon the stylus will fall into the groove 37 which holds it against lateral movement. At this time, the brush 40 will be entirely on the insulative strip 43, thus opening the motor circuit and so the record will stop moving. The strip 25 will be against the stop 35. The apparatus 15 is now in the condition it was before put to use. The cycle of operation described, is repeated as many times as desired.

The operation of the apparatus 15 will in no manner be stopped or interfered with regardless of its position, whether upright, tilted or inverted or when the record position is in a vertical plane. Hence, this apparatus 15 per se, or when in a doll or other toy, or even in a roller or a ball 47, will continue to play although the doll is moved into any position, or the ball is let roll, or the roller is let roll. Either the spring action of the strip 25 will maintain the stylus in contact with the record, and when the apparatus is in any inverted position, gravity will act and cause the shaft 18 to slide due to the weight it carries, thus bringing the record 21 downwards, whereupon the contact between the stylus 29 and the record is maintained. When the apparatus becomes uprightly slanted or erect, the shaft 18 due to the weight it carries, will slide back for its collar 48 to again bear against the frame plate 19', and the flexed strip 25 will then maintain the stylus 29 in contact with the record. There will be no interruption in the operation of the phonograph apparatus. This of course presumes that there has been no violent manual movement shifting the apparatus as a whole. But if there should occur a sudden jerk causing an undue force to dislodge the tone arm so that the stylus 29 leaves the record 21, the tone arm's movement away from the record 21 will be stopped by the slightly spaced element 36 which acts as a bumper, and the tone arm 24 will promptly reassume its normal position, restoring the stylus into contact with the record.

The phonograph apparatus indicated generally as 15' in the ball or roller shell 47, has its shaft 26 long enough to make its knob 39 accessible at the opening 50, and here, instead of the structure 32 comprising the stops 34, 35 and the connecting bumper element 36, said ball or roller shell may have integral therewith therein, an inverted U-shaped element 32' to offer unto the tone arm 24, all the incidents of the structure 32. In fact, any casing or hollow body the phonograph apparatus may be in, may include a structure similar to 32', so when such housing is closed to contain the phonograph apparatus, the stop and bumper structure for the tone arm will be provided in proper position to function as does the structure 32 in the embodiment shown in FIG. 1.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showing herein, to indicate the scope of this invention.

I claim:

1. In a phonograph apparatus, a frame, a shaft revolvably and axially movably mounted on the frame, a phonograph record having a sound groove fixed on said shaft, a motor means to revolve said shaft carried on the frame, a pick-up arm comprising a springy strip element mounted for swinging movement at one of its ends on the frame, for movement across the record and a means including a stylus associated with a diaphragm at the other end of said strip, adapted when said shaft is turning and said stylus is in contact with a sound groove on the record, to translate vibrations of the stylus into sound; said strip being biased so that said stylus normally contacts the record; means mounting said shaft for longitudinal movement from a normal position on the frame to bring the record to the stylus when said apparatus is shifted to be in an inverted position; it being the action of gravity that is relied on to move said shaft away from said normal position when the apparatus is shifted to be in an inverted position and to return said shaft to said normal position on the frame, when the apparatus is shifted to again be in an upright position.

2. A phonograph apparatus as defined in claim 1, including a bumper element fixed on the frame; said strip being intermediate said bumper and the record and said bumper being in a position across said strip and spaced from the strip slightly more than sufficient to allow the tone arm to be moved so that the stylus gets off the record's surface while the strip remains spaced from said bumper, and to be swung so that the stylus is opposite the start position on the record; said bumper being adapted to intercept the strip in the event said strip is moved sufficiently towards it at any position said strip may be in opposite the surface of the record.

3. A phonograph apparatus as defined in claim 2, wherein said bumper has a leg at each of its ends respectively, to serve as stops for the strip when the stylus is at the start and at the finish positions on the record; the distal end of the leg serving as the stop at the finish end of the record and being spaced from the record sufficient to allow the shaft holding the record its required sliding movement.

4. A phonograph apparatus as defined in claim 2, including a casing housing said phonograph apparatus; said bumper element being on said casing and therewithin.

5. A phonograph apparatus as defined in claim 4, wherein said casing is a ball.

6. A phonograph apparatus as defined in claim 4, wherein said casing is a roller.

7. A phonograph apparatus as defined in claim 1, wherein in extension of the finish end of the sound groove of the record, there is a comparatively deep groove adapted to engage the stylus to hold it against lateral movement.

8. A phonograph apparatus as defined in claim 7, including an element in a fixed position on the frame, serving to stop said strip when the stylus is lodged in said deep groove in the record.

References Cited by the Examiner

UNITED STATES PATENTS

| | | | |
|---|---|---|---|
| 1,307,020 | 6/1919 | Peal | 274—42 |
| 1,675,852 | 7/1928 | Geer | 274—42 |
| 2,555,800 | 6/1951 | Levine | 274—1 |
| 3,082,006 | 3/1963 | Ryan | 274—1 |

FOREIGN PATENTS

| | | |
|---|---|---|
| 1,052,348 | 9/1953 | France. |

NORTON ANSHER, *Primary Examiner.*

W. E. JACKSON, *Assistant Examiner.*